(12) United States Patent
Rausch et al.

(10) Patent No.: US 7,831,213 B1
(45) Date of Patent: Nov. 9, 2010

(54) METHOD AND SYSTEM FOR CONFIGURING A TOWER TOP LOW NOISE AMPLIFIER

(75) Inventors: Walter F. Rausch, Shawnee, KS (US); William Bloomingdale, Leesburg, VA (US); David A. Maples, Manassas, VA (US)

(73) Assignee: Clear Wireless LLC, Kirkland, WA (US)

( * ) Notice: Subject to any disclaimer, the term of this patent is extended or adjusted under 35 U.S.C. 154(b) by 546 days.

(21) Appl. No.: 11/948,723

(22) Filed: Nov. 30, 2007

(51) Int. Cl.
*H04B 1/44* (2006.01)
(52) U.S. Cl. .............................. 455/78; 455/73; 455/83; 455/341; 455/291; 370/275; 370/280; 370/294; 333/100; 333/101; 333/124
(58) Field of Classification Search .................. 455/73, 455/78, 83, 130, 341, 291, 293; 370/275, 370/280, 294; 333/100, 101, 124
See application file for complete search history.

(56) References Cited

U.S. PATENT DOCUMENTS 6,560,456 B1 * 5/2003 Lohtia et al. ................. 455/445

2003/0092403 A1 * 5/2003 Shapira et al. .............. 455/101
2007/0264934 A1 * 11/2007 Holder et al. .............. 455/13.3

* cited by examiner

*Primary Examiner*—Tuan A Pham
(74) *Attorney, Agent, or Firm*—McDonnell Boehnen Hulbert & Berghoff LLP

(57) ABSTRACT

Controlling a tower-top low noise amplifier (TTLNA) without transmit mode or receive mode timing control signals from a base station. The TTLNA system and associated components autonomously determine the proper mode of operation (transmit/receive), and automatically control the operation of a low noise amplifier (LNA) to prevent signal distortion and/or damage to the wireless system hardware. A preferred method comprises: at a TTLNA, measuring a transmit time period based on detecting radio frequency (RF) transmit signal energy; determining a receive time duration based on the measured time period and a predetermined frame time; and, configuring the TTLNA to a receive mode by placing a low noise amplifier into a receive signal path during the determined receive time duration.

17 Claims, 4 Drawing Sheets

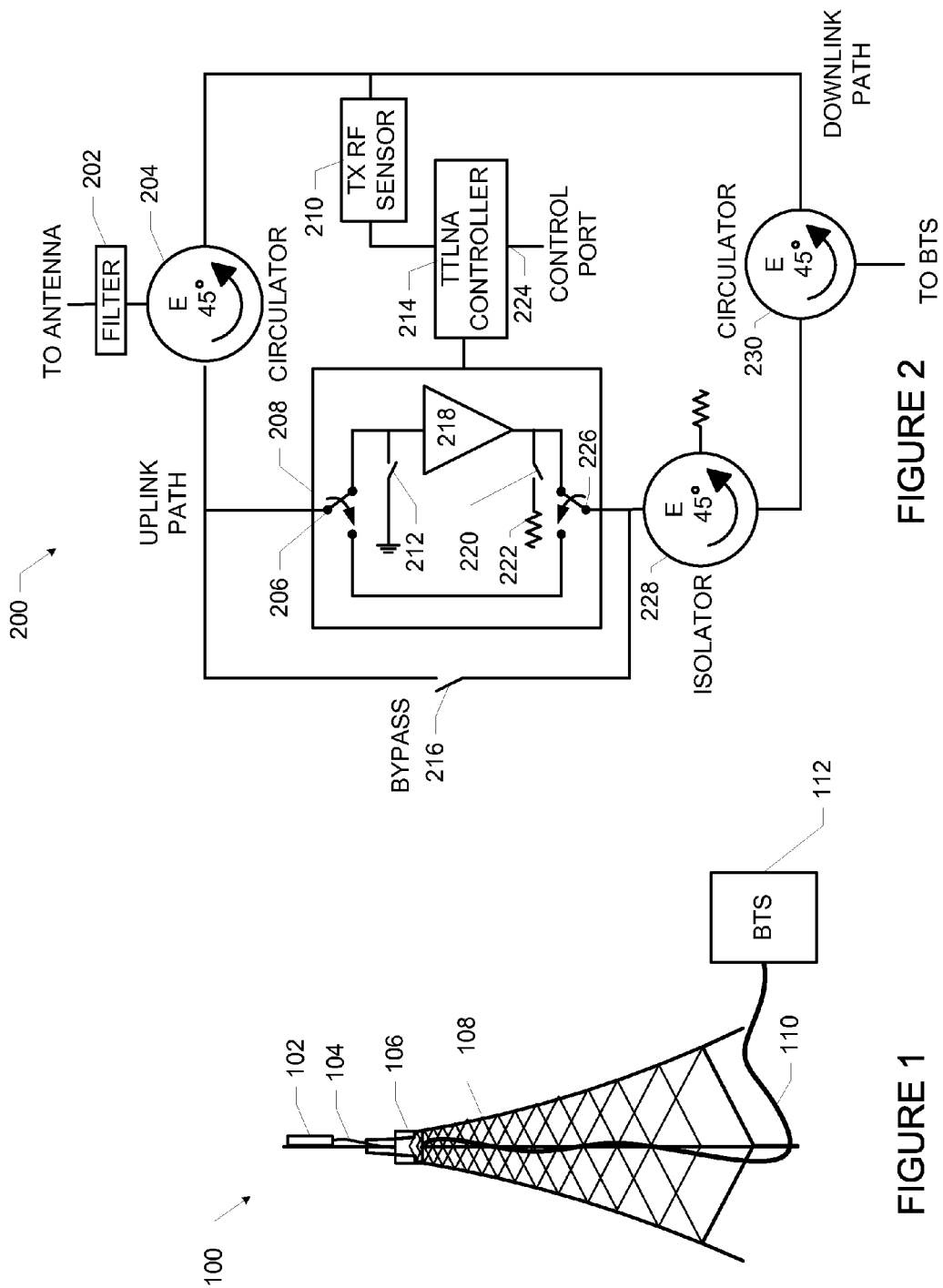

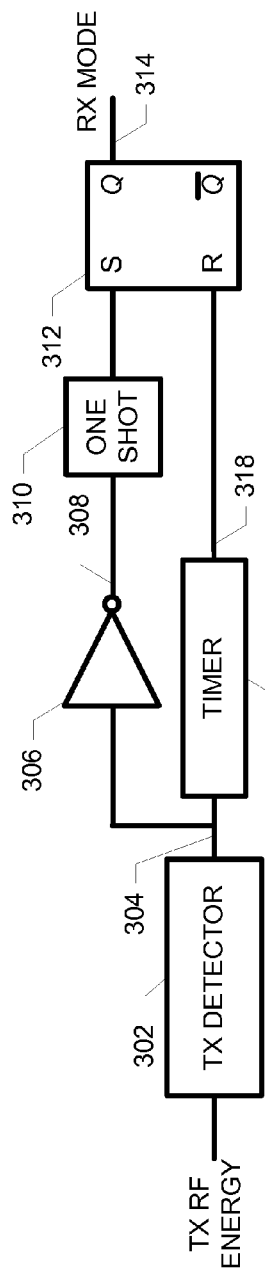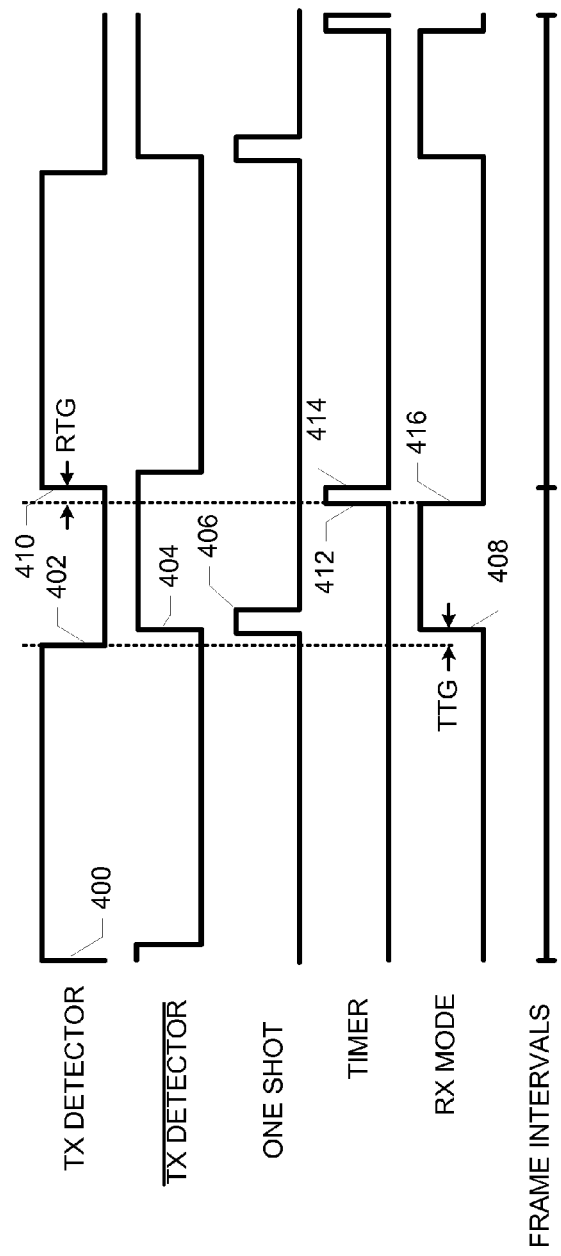

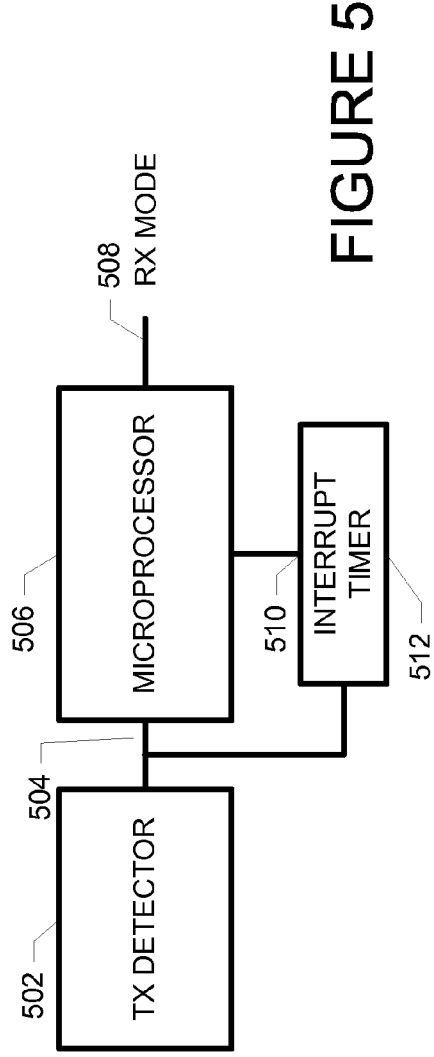
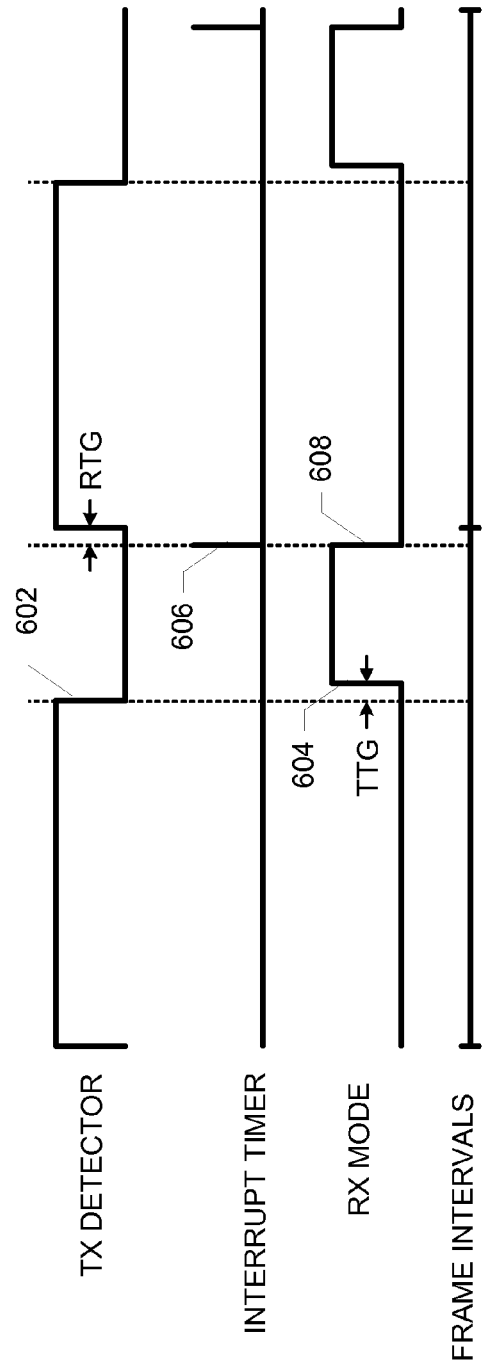

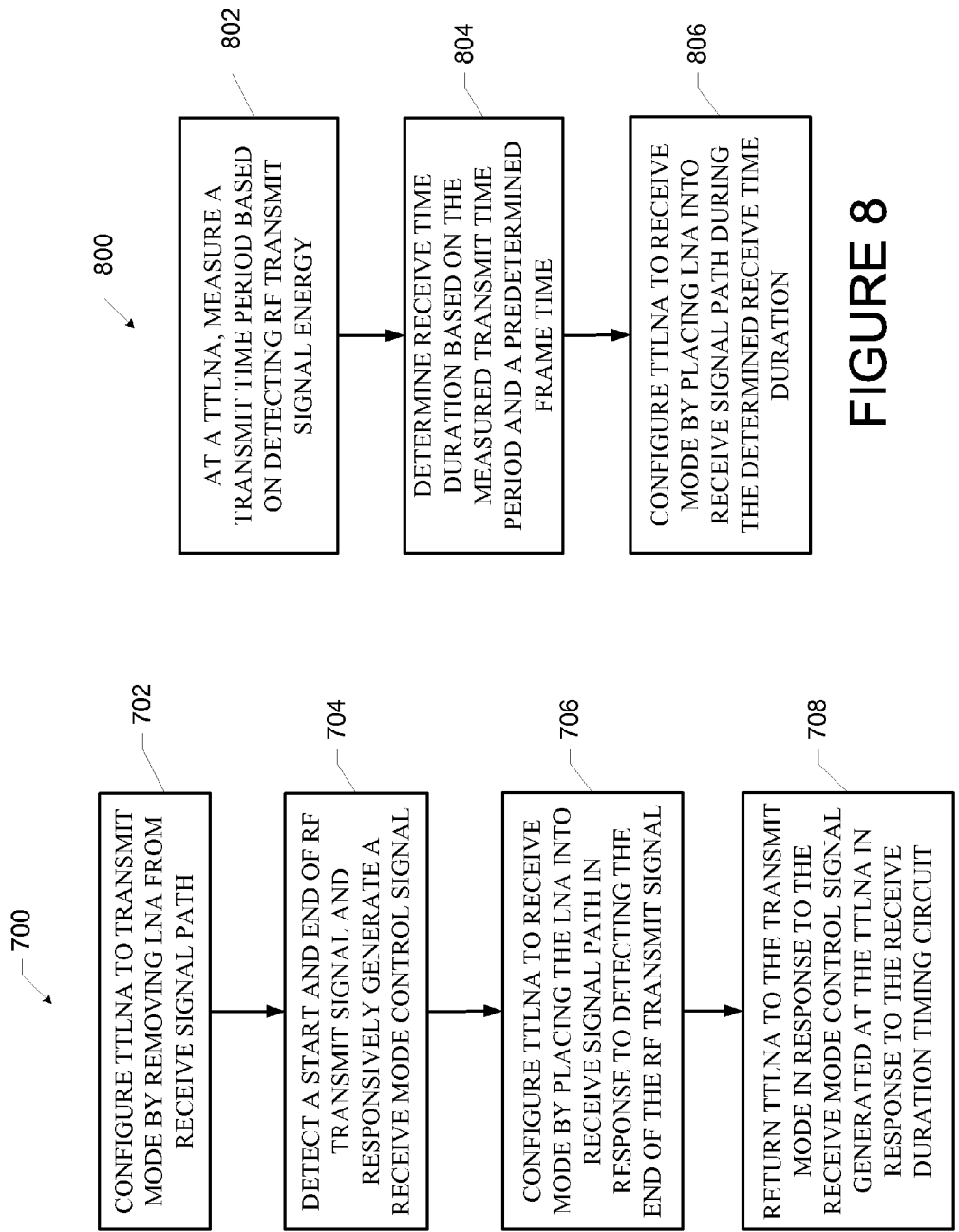

METHOD AND SYSTEM FOR CONFIGURING A TOWER TOP LOW NOISE AMPLIFIER

FIELD OF THE INVENTION

The present invention relates to wireless communications and, more particularly, to a method and system of controlling tower top low noise amplifiers.

BACKGROUND

Wireless communication systems typically include a base transceiver station (BTS) that provides service to one or more mobile stations within the coverage area of the BTS. The BTS may include a radio antenna system having one or more antennas mounted on a tower. The antennas may transmit downlink signals to and/or receive uplink signals from one or more mobile stations serviced by the BTS. Further, the radio antenna system may also include a tower-top low-noise amplifier assembly (TTLNA) and a feedline system (collectively, a receive signal path), which connects the base station located at the bottom of the tower to various components located at the top of the tower, such as the TTLNA.

It is standard practice to initialize the TTLNA in receive mode. Once the TTLNA has been initialized, the TTLNA will typically operate in either receive mode or in transmit mode. In receive mode, the TTLNA operates to receive signals from the antenna. The TTLNA passes the received signals through a sensitive microwave low noise amplifier (LNA) to amplify the signals. The amplified signals are then sent to the base station via the feedline system. In transmit mode, the TTLNA receives powerful transmit signals from the base station. In this mode, the LNA is bypassed and the powerful transmit signals from the base station are sent to the antenna.

According to current practice, the TTLNA relies on a relatively simple on-off signaling scheme to switch between receive mode and transmit mode. In this signaling scheme, the presence of a control signal causes the TTLNA to switch into transmit mode. And the absence of a signal causes the TTLNA to switch to its default resting state (i.e., receive mode).

SUMMARY

Disclosed herein is an improved method of switching a low noise amplifier into or out of the receive signal path. In particular, a TTLNA system and associated components are disclosed that autonomously determine the proper mode of operation (transmit/receive), and automatically controls the operation of a low noise amplifier (LNA) to prevent signal distortion and/or damage to the wireless system hardware.

In one embodiment, a preferred method of controlling a tower-top low noise amplifier (TTLNA) comprises, at a TTLNA, measuring a transmit time period based on detecting radio frequency (RF) transmit signal energy; determining a receive time duration based on the measured time period and a predetermined frame time; and, configuring the TTLNA to a receive mode by placing a low noise amplifier into a receive signal path during the determined receive time duration.

In a further preferred embodiment, a method of controlling a tower-top low noise amplifier (TTLNA) comprises configuring a TTLNA to the transmit mode by removing a low noise amplifier (LNA) from a receive signal path; at a TTLNA receive duration timing circuit, detecting a start of a radio frequency (RF) transmit signal and an end of an RF transmit signal and responsively generating a receive mode control signal; configuring a TTLNA to the receive mode by placing the LNA into the receive signal path in response to detecting the end of the RF transmit signal; and returning the TTLNA to the transmit mode in response to the receive mode control signal generated at the TTLNA in response to the receive duration timing circuit.

Preferably a power detection circuit is used to detect the start and end of the RF transmit signal. The LNA may be removed from a receive path by the use of RF switches and/or grounding an input of the LNA. In some embodiments, the receive duration timing circuit comprises a counter or timer circuit. The output from the counter circuit is preferably used to generate the receive mode control signal to initiate or terminate the receive period. Alternatively, the output from the counter is used to interrupt a processor or microcontroller, which generates the receive mode control signal to terminate a receive period.

In some embodiments a latch circuit or flip-flop may be used for generating the receive mode control signal. The receive mode control signal also preferably provides a time delay before placing the LNA in the receive signal path after the detection of the end of the RF transmit signal during a transmit-to-receive gap. Similarly, the receive mode control signal switches the TTLNA back to transmit mode during the receive-to-transmit gap. In further embodiments, the receive mode control signal may be used to control a second LNA that services an additional receive signal path.

Control signaling is also provided for generating an alarm signal when the start of an RF transmit signal is not detected during a predetermined time. Additionally, the method may use a command signal that overrides the receive mode control signal and responsively places the TTLNA into either the transmit mode or the receive mode.

In still further embodiments, a tower-top low noise amplifier assembly (TTLNA) is provided. The TTLNA preferably includes a low noise amplifier (LNA) that is switchably coupled to a receive signal path; a power detection circuit coupled to a transmit signal path for generating a transmit power signal indicative of transmit energy being present; a receive timing circuit coupled to the power detection circuit for generating a receive mode control signal in response to the transmit power signal; and, wherein the receive timing circuit is coupled to the LNA and the receive mode control signal is used to couple and decouple the LNA from the receive signal path.

The receive timing circuit may be a microprocessor and a counter or timer for generating a microprocessor interrupt signal indicating an end-of-frame time. Alternatively, a counter and a logic circuit may be used to provide the receive slot timing reference. The counter or timer is preferably started in response to the transmit power signal, and provides an output indicative of the end of the receive mode substantially coincident with an end of a frame time. The counter may be configurable to provide for desired time durations.

BRIEF DESCRIPTION OF THE DRAWINGS

Embodiments of the invention are described herein with reference to the drawings, in which:

FIG. 1 is a block diagram depicting a radio antenna system, in accordance with exemplary embodiments;

FIG. 2 is a block diagram of preferred TTLNA assembly;

FIG. 3 is one embodiment of a timing circuit for generating a receive mode control signal;

FIG. 4 is a timing diagram associated with the circuit of FIG. 3;

FIG. 5 is an alternative embodiment of a timing circuit for generating a receive mode control signal;

FIG. 6 is a timing diagram associated with the circuit of FIG. 5;

FIGS. 7 and 8 are flow diagrams associate it with preferred methods described herein.

DETAILED DESCRIPTION

FIG. 1 is a simplified block diagram depicting a radio antenna system 100 that may be used in accordance with exemplary embodiments. As illustrated, the radio antenna system 100 includes an antenna 102, a cable 104, a tower-top low noise amplifier (TTLNA) system 106, a tower 108, a feedline 110, and a base transceiver station (BTS) 112. The system illustrated in FIG. 1 preferably operates in a Worldwide Interoperability for Microwave Access (WiMAX) system (i.e., the IEEE 802.16 standard).

It should be understood that the arrangements described herein are for purposes of example only. For example, antenna 102 may include a plurality of antennas in which different antennas are dedicated to either receiving uplink signals or transmitting downlink signals. As another example, antenna 102 may be situated on a structure other than tower 108. For instance, antenna 102 may be situated on a building. As such, those skilled in the art will appreciate that other arrangements and other elements (e.g. machines, interfaces, functions, orders, and groupings of functions, etc.) can be used instead. Further, many of the elements described herein are functional entities that may be implemented as discrete or distributed components or in conjunction with other components, in any suitable combination or location.

In normal operation, antenna 102 receives uplink signals from devices in communication with the radio antenna system 100. The uplink signals received by antenna 102 are transmitted to the TTLNA system 106 via cable 104. TTLNA system 106 amplifies the received uplink signals and then sends the amplified uplink signals to BTS 112 via the feedline 110. In addition, antenna 102 operates to transmit downlink signals to devices in communication with the radio antenna system 100. The power amplifier in BTS 112 sends the downlink signals to TTLNA system 106 via the feedline 110. The TTLNA system 106 then passes the downlink signals via cable 104 to antenna 102. The downlink signal is then transmitted to device in communication with radio antenna system 100, via antenna 102.

Radio antenna system 100 separates uplink and downlink signals by using a time division duplex (TDD) transmission scheme. Using the TDD transmission scheme, BTS 112 assigns a common frequency channel to both the uplink and downlink communication signals. BTS 112 toggles back and forth between sending communications signals to the antenna 102 (i.e., downlink signals) and receiving communication signals from the antenna 102 (i.e., uplink signals). In a preferred transmission scheme such as WiMAX, BTS 112 may switch between receiving uplink signals and sending downlink signals up to 200 times a second.

In a TTD transmission scheme, feedline 110 carries amplified uplink signals from the TTLNA system 106 to the BTS 112 during a first time period. And in a second time period, the feedline 110 carries downlink signals from the BTS 112 to the antenna 102 via TTLNA system 106. In this way, feedline 110 alternates between carrying uplink and downlink communication signals.

As noted above, radio antenna system 100 operates in a TDD transmission scheme. As the feedline 110 alternates between receiving uplink and sending downlink signals, the TTLNA system 106 must also alternate between transmit mode and receive mode. When the feedline 110 is carrying downlink signals to the antenna 102, it is preferred that the LNA 106 is not configured to receive mode. Should the LNA 106 be in receive mode when feedline 110 is carrying downlink signals to the antenna 102 (because of a failure to properly switch modes), the downlink signals may damage the sensitive LNA 106 resulting in a possible sector outage. In such a scenario, a technician may need to physically climb the tower to replace and/or repair the damaged LNA 106.

Along with carrying uplink signal and/or downlink signals, feedline 110 also carries other signals to and from the antenna 102. As examples, feedline 110 carries DC power up from the BTS 112 to power the TTLNA system 106 and other components located at the top of the tower 108. The feedline 110 may also carry an Antenna Interface Standards Group (AISG) signal, which is used to monitor the system status and provide control over non-time critical functions. For example, the AISG signal may be used for positioning the antenna 102.

With reference to FIG. 2, a TTLNA assembly 200 is provided. The TTLNA preferably includes a low noise amplifier (LNA) 218 that is switchably coupled to a receive signal path, or uplink path. Signals received from the antenna are filtered by filter 202 and passed through the circulator 204. The received signals are then passed through the assembly 208 to the isolator 228 and the circulator 230 and finally provided to the base transceiver station (BTS). Additionally a bypass switch 216 is provided to bypass the assembly 208 in the event of a power failure or in response to a control command. Transmit signals from the BTS are passed through circulator 230 to circulator 204 for transmission by the antenna.

A power detection circuit 210 in the form of a transmit radio frequency (RF) sensor is coupled to the transmit signal path, or downlink path. The power detection circuit 210 generates a transmit power signal indicative of transmit energy being present. The TTLNA controller 214 receives the transmit power signal and responsively controls the LNA 218. The receive mode control signal is provided to the assembly 208 and is used to couple and decouple the LNA from the receive signal path. The LNA 218 may be provided in an assembly 208, which includes switches 206, 226 that operate in response to the receive mode control signal to place LNA 218 in the received path. Also included are switches 212, 220, that are responsive to the receive mode control signal for grounding the input to LNA 218, or placing a terminating load 222 on the output of LNA 218, respectively. Switches 206, 226 may be analog RF switches, magnetic circulators, microwave PIN diode switches, or the like. Switches 212, 220 may be analog RF switches, microwave PIN diode switches, or the like. The receive mode control signal may also be provided out control port 224 for controlling additional LNAs.

The position of switches 206, 226 determines whether LNA 218 is operating in transmit mode ($T_x$) or receive mode (Rx). According to the position of switches 206, 226 as illustrated in FIG. 2, LNA 218 is currently operating in receive mode. In this mode, the LNA 218 is connected to the uplink path associated with feedline 110.

The position of switches 212, 220 determines whether LNA 218 is operating in transmit mode ($T_x$) or receive mode (Rx). According to the position of switches 212, 220 as illustrated in FIG. 2, LNA 218 is configured to operate in receive mode. In this mode, the LNA 218 has no termination on its input and no terminating load attached to its output.

In transmit/bypass mode, switches 212, 220 are positioned such that the LNA 218 has a ground on its input and a load 222 on its output. In this mode, LNA 218 is prevented from amplifying any extraneous signals that may be present in the associated circuitry, avoiding the possibility of creating localized interference while maintaining power to the amplifier and maintaining its stability.

The TTLNA controller 214 preferably includes a receive timing circuit, as shown in FIG. 3, for generating a receive mode control signal in response to the transmit power signal. A logic circuit preferably includes an inverter 306, a one-shot flip-flop 310, and RS flip-flop 312. Waveforms associated with the elements of FIG. 3 are depicted in FIG. 4. The TX detector 302 is preferably an RF sensor used for detecting the presence of RF energy. The output on line 304 is a logic signal as shown in FIG. 4, depicting the presence of RF transmit energy by a high logic value, and the absence of transmit energy by a low logic value. The rising edge transition 400 indicates the start of RF transmit signal energy, while the transition 402 indicates the end of RF transmit signal energy. The rising edge transition 400 initiates the timer 316, causing it to begin counting.

The output of TX detector 302 is also provided to inverter 306, which delays and inverts the power detection signal from TX detector 302 to generate the signal TXDETECTOR as shown in FIG. 4. The output of inverter 306 is applied over a line 308 to the one-shot flip-flop 310. The rising edge 404 causes the one-shot 310 to emit a pulse 406 on the ONE SHOT signal shown in FIG. 4. The rising edge of pulse 406 sets the flip-flop 312 causing the output on line 314 to go to a logic high, as shown by rising edge 408. The RX MODE signal is applied to assembly 208 and the rising edge of the signal appropriately configures the switches 206, 226, 212, 220, to place LNA 218 into the received signal path. Note that the inverter 306 preferably provides a short delay with respect to the end of the transmit power detection. The amount of this delay is preferably configurable, and may be adjusted by providing additional buffer circuits, by altering the threshold input of one-shot 310, or by any other suitable means. The delay is desirable to ensure that the transmit energy level has sufficiently subsided prior to placing the LNA in the received signal path.

Timer 316 initiates counting at the beginning of the transmit cycle in response to the TX DETECTOR signal, and is configured to count an entire frame duration, or some predetermined amount less than an entire frame duration. At the end of the frame duration the timer/counter output goes from a logic low to a logic high on line 318, as shown by rising edge 412 in FIG. 4. The rising edge 412 is applied to the flip-flop 312 to reset the flip-flop output 314 to a logic low value, as shown by falling edge 416 of the RX MODE signal. The low value of the RX MODE signal is applied to the assembly 208, and the respective switches 206, 226, 212, 222 thereby remove the LNA 218 from the received signal path.

As shown in FIG. 5, the receive timing circuit may take the form of a microprocessor 506 and a counter or timer 512 for generating a microprocessor interrupt signal on line 510 indicating an end-of-frame time. The microprocessor 506 receives the TX DETECTOR signal from TX detector 502 over line 504. Line 504 may also be an interrupt line to the microprocessor, or may be an input port monitored by the microprocessor 506. Alternatively, the microprocessor 506 may utilize a scheduling algorithm to determine the beginning and ending of the receive period in response to the transmit signal power detect signal.

As shown in FIG. 6, the falling edge 602 of the TX DETECTOR signal is detected by microprocessor 506 whereupon the microprocessor 506 generates an RX mode signal on line 508, having a rising edge 604. The TX DETECTOR signal is also provided to the interrupt timer 512, wherein a rising edge causes the interrupt timer 512 to begin counting a frame time duration. At the end of the frame time or substantially near the end of the frame time, the interrupt timer 512 initiates an interrupt signal 606 to the microprocessor 506 on line 510. The microprocessor 506 responsively terminates the RX mode signal, returning it to a low logic value shown by transition 608.

AISG control signaling may also be utilized. In one aspect, the TTLNA assembly may generate an alarm signal when the start of an RF transmit signal is not detected during a predetermined time, such as 10 frames or 50 ms. The alarm may be transmitted to the BTS via AISG signaling. Additionally, the system is preferably responsive to a command signal (such as a command conveyed by AISG signaling) that overrides the receive mode control signal and responsively places the TTLNA into either the transmit mode or the receive mode, in accordance with the command. The commands may be in accordance with a Simple Networking Management Protocol (SNMP).

In one preferred embodiment, a method 700 of controlling a tower-top low noise amplifier (TTLNA) is shown in FIG. 7. At step 702, the TTLNA is configured to the transmit mode by removing a low noise amplifier (LNA) from a receive signal path. As described above, the LNA 218 may be removed from a receive path by the use of RF switches and/or grounding an input of the LNA 218. At step 704, the start of a radio frequency (RF) transmit signal and an end of an RF transmit signal is detected. Preferably a power detection circuit is used to detect the start and end of the RF transmit signal. The power detection circuit is used in conjunction with the receive duration timing circuit, which responsively generates a receive mode control signal. At step 706 the TTLNA is configured to the receive mode by placing the LNA into the receive signal path in response to detecting the end of the RF transmit signal. At step 708 the TTLNA is returned to the transmit mode in response to the receive mode control signal generated at the TTLNA in response to the receive duration timing circuit.

An alternative embodiment a preferred method 800 of controlling a tower-top low noise amplifier (TTLNA) is shown in FIG. 8. At step 802 a transmit time period is measured at a TTLNA. The measurement is based on detecting RF transmit signal energy from the BTS. At step 804 a receive time duration is determined based on the measured transmit time period and a predetermined frame time. At step 806 the TTLNA is configured to a receive mode by placing a low noise amplifier into a receive signal path during the determined receive time duration.

Exemplary embodiments of the present invention have been described above. Those skilled in the art will understand, however, that changes and modifications may be made to the embodiments described without departing from the true scope and spirit of the present invention, which is defined by the claims.

The invention claimed is:

1. A method of controlling a tower-top low noise amplifier (TTLNA) comprising:
   configuring a TTLNA to the transmit mode by removing a low noise amplifier (LNA) from a receive signal path, wherein removing the LNA from a receive path includes grounding an input of the LNA and terminating the output of the LNA;
   at a TTLNA receive duration timing circuit, detecting a start of a radio frequency (RF) transmit signal and an end of an RF transmit signal and responsively generating a receive mode control signal;
   configuring a TTLNA to the receive mode by placing the LNA into the receive signal path in response to detecting the end of the RF transmit signal; and returning the TTLNA to the transmit mode in response to the receive mode control signal generated at the TTLNA in response to the receive duration timing circuit.

2. The method of claim 1 wherein the step of detecting a start of an RF transmit signal and an end of an RF transmit signal is performed by a power detection circuit.

3. The method of claim 1 wherein the receive duration timing circuit comprises a counter circuit.

4. The method of claim 3 wherein an output from the counter circuit is used to generate the receive mode control signal to terminate a receive period.

5. The method of claim 3 wherein an output from the counter is used to interrupt a processor which generates the receive mode control signal to terminate a receive period.

6. The method of claim 1 wherein the receive duration timing circuit includes a microprocessor for generating the receive mode control signal.

7. The method of claim 1 wherein the receive duration timing circuit includes a counter circuit and a latch circuit for generating the receive mode control signal.

8. The method of claim 1 wherein the receive mode control signal provides a time delay before placing the LNA in the receive signal path after the detection of the end of the RF transmit signal.

9. The method of claim 1 further comprising providing the receive mode control signal to a second LNA in a second receive signal path.

10. The method of claim 1 further comprising generating an alarm signal when the start of an RF transmit signal is not detected during a predetermined time.

11. The method of claim 1 further comprising receiving a command signal that overrides the receive mode control signal and responsively placing the TTLNA into either the transmit mode or the receive mode.

12. A tower-top low noise amplifier assembly (TTLNA) comprising:
 a low noise amplifier (LNA) switchably coupled to a receive signal path;
 a power detection circuit coupled to a transmit signal path for generating a transmit power signal indicative of transmit energy being present;
 a receive timing circuit coupled to the power detection circuit for generating a receive mode control signal in response to the transmit power signal, wherein the receive timing circuit comprises a counter that is started in response to the transmit power signal, and provides an output indicative of the end of a frame time; and
 wherein the receive timing circuit is coupled to the LNA and the receive mode control signal is used to couple and decouple the LNA from the receive signal path.

13. The TTLNA assembly of claim 12 wherein the receive timing circuit comprises a microprocessor.

14. The TTLNA assembly of claim 13 wherein the receive timing circuit further comprises a counter for generating a microprocessor interrupt signal indicating an end of frame time.

15. The TTLNA assembly of claim 1 wherein the counter is configurable for a desired time duration.

16. The TTLNA assembly of claim 12 wherein the receive mode control signal indicates an end of a receive time period that precedes the beginning of a transmit time period by a predetermined guard interval.

17. The TTLNA assembly of claim 16 wherein the guard time interval is controlled by configuring a counter.

* * * * *